(12) United States Patent
Chen (10) Patent No.: US 8,493,505 B2
(45) Date of Patent: Jul. 23, 2013

(54) AUTOMATIC CLEAN DEVICE FOR A SURVEILLANCE CAMERA

(75) Inventor: Ming Tsun Chen, Kaohsiung (TW)

(73) Assignee: Hwan Ming Enterprise Co., Ltd., Kaohsiung (TW)

( * ) Notice: Subject to any disclaimer, the term of this patent is extended or adjusted under 35 U.S.C. 154(b) by 118 days.

(21) Appl. No.: 13/253,422

(22) Filed: Oct. 5, 2011

(65) Prior Publication Data

US 2013/0086765 A1  Apr. 11, 2013

(51) Int. Cl.
*H04N 5/225* (2006.01)

(52) U.S. Cl.
USPC ........... 348/373; 348/374; 348/375; 348/376; 348/143; 348/148

(58) Field of Classification Search
USPC .......... 348/143, 148, 373–376, 335, 340, 348/345, 348; 396/427, 535, 25, 81
See application file for complete search history.

(56) References Cited

U.S. PATENT DOCUMENTS

| 7,628,551 | B2 * | 12/2009 | Leyden et al. | 396/427 |
| 7,683,968 | B2 * | 3/2010 | Hagihara et al. | 348/373 |
| 2004/0075739 | A1 * | 4/2004 | Wada | 348/143 |
| 2008/0158354 | A1 * | 7/2008 | Hutchison | 348/143 |

\* cited by examiner

*Primary Examiner* — Yogesh Aggarwal
(74) *Attorney, Agent, or Firm* — Shimokaji & Associates P.C.

(57) ABSTRACT

An automatic clean device for a surveillance camera has an automatic cleaner. The automatic cleaner is connected to the surveillance camera directly or via an angle adjusting mechanism and has a housing, and an operating assembly, a driving assembly and a cleaning assembly mounted in the housing. The driving assembly drives the operating assembly to move linearly and turn. The cleaning assembly is mounted on the operating assembly and cleans a lens of the surveillance camera. The cleaning head is not disposed in front of the lens and is disposed away from the lens when the automatic cleaner is not executing its cleaning task. Thus, the cleaning head does not obstruct the surveillance camera so the surveillance camera is able to film complete images.

20 Claims, 6 Drawing Sheets

AUTOMATIC CLEAN DEVICE FOR A SURVEILLANCE CAMERA

BACKGROUND OF THE INVENTION

1. Field of the Invention

The present invention relates to an automatic clean device for a surveillance camera, especially to an automatic clean device that cleans a lens of the surveillance camera.

2. Description of the Prior Art(s)

A surveillance camera is mounted at high place indoors or outdoors and is supported by a supporting bracket to record or monitor events happening around. To ensure that images captured by the surveillance camera is clear in definition, lens of the surveillance camera has to be cleaned regularly or irregularly. However, since the surveillance camera is disposed at high place via the supporting bracket, people should climb up a ladder to clean the lens of the surveillance camera, which is inconvenient. Therefore, some automatic clean devices or dedusting devices are developed and are mounted beside the surveillance camera to automatically clean the lens of the surveillance camera regularly or irregularly.

A conventional dedusting device for a lens of a surveillance camera has an air pipe connected to a high air pressure source, and a nozzle mounted on an end of the air pipe. The nozzle corresponds to the lens of the surveillance camera and ejects high pressure air to the lens to eliminate dust from the lens.

Another conventional clean device for a lens of a surveillance camera has a wiper mounted on the lens and driven by a motor to wipe dust from the lens.

However, the conventional dedusting device and the conventional clean device are securely mounted on the surveillance cameras. Therefore, the wiper mounted on the lens obstructs the surveillance camera so the surveillance camera only films incomplete images. Moreover, although the nozzle of the conventional dedusting device is able to be disposed in front of and underneath the lens and does not obstruct the surveillance camera, the nozzle is immovable so is unable to clean the lens thoroughly.

To overcome the shortcomings, the present invention provides an automatic clean device to mitigate or obviate the aforementioned problems.

SUMMARY OF THE INVENTION

The main objective of the present invention is to provide an automatic clean device for a surveillance camera. The automatic clean device has an automatic cleaner. The automatic cleaner is connected to the surveillance camera directly or via an angle adjusting mechanism and has a housing, and an operating assembly, a driving assembly and a cleaning assembly mounted in the housing. The driving assembly drives the operating assembly to move linearly and turn. The cleaning assembly is mounted on the operating assembly and cleans a lens of the surveillance camera.

The cleaning head is not disposed in front of the lens and is disposed away from the lens when the automatic cleaner is not executing its cleaning task. Thus, the cleaning head does not obstruct the surveillance camera so the surveillance camera is able to film complete images.

Other objectives, advantages and novel features of the invention will become more apparent from the following detailed description when taken in conjunction with the accompanying drawings.

DETAILED DESCRIPTION OF THE PREFERRED EMBODIMENTS

Figure 7:
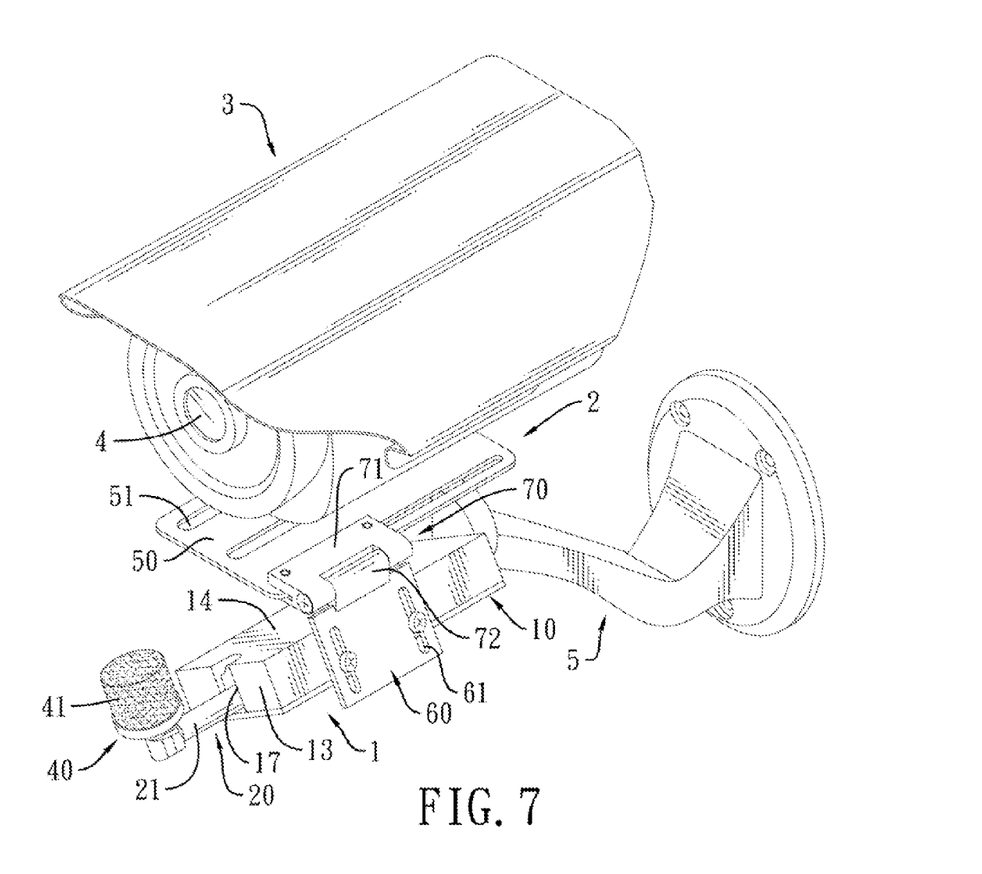
FIG. 7 is an operational perspective view of the automatic clean device in FIG. 6, showing the surveillance camera being assembled with the automatic clean device.

With reference to FIG. 7, an automatic clean device for a surveillance camera 3 in accordance with the present invention is mounted beside the surveillance camera 3, is electrically connected to a controlling system or a controlling switch of the surveillance camera 3 to clean a lens 4 of the surveillance camera 3 and comprises an automatic cleaner 1 and a positioning frame 2.

Figure 1:
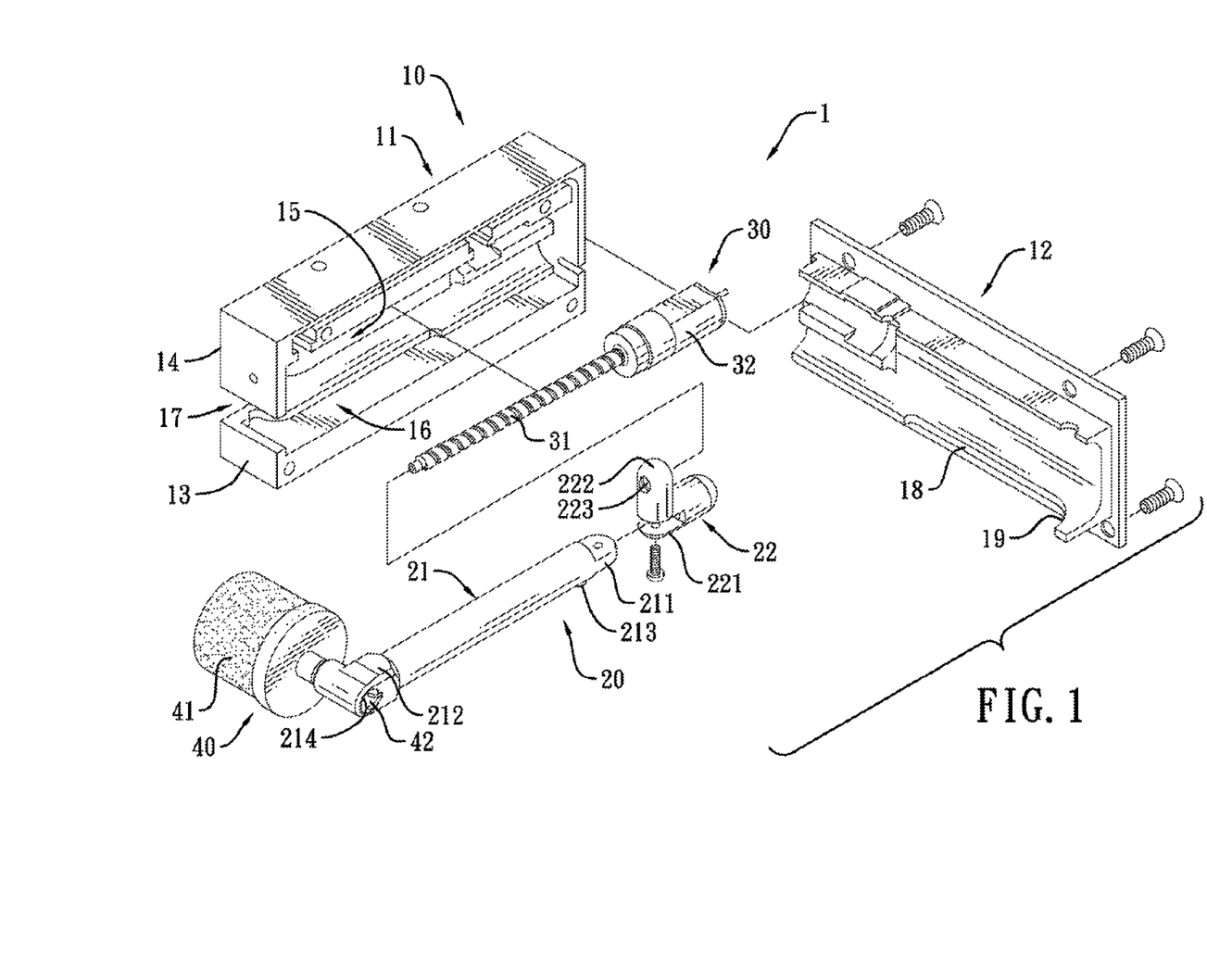
FIG. 1 is an exploded perspective view of an automatic cleaner of an automatic clean device for a surveillance camera in accordance with the present invention.

With further reference to FIG. 1, the automatic cleaner 1 has a housing 10, an operating assembly 20, a driving assembly 30 and a cleaning assembly 40.

Figures 2, 3:
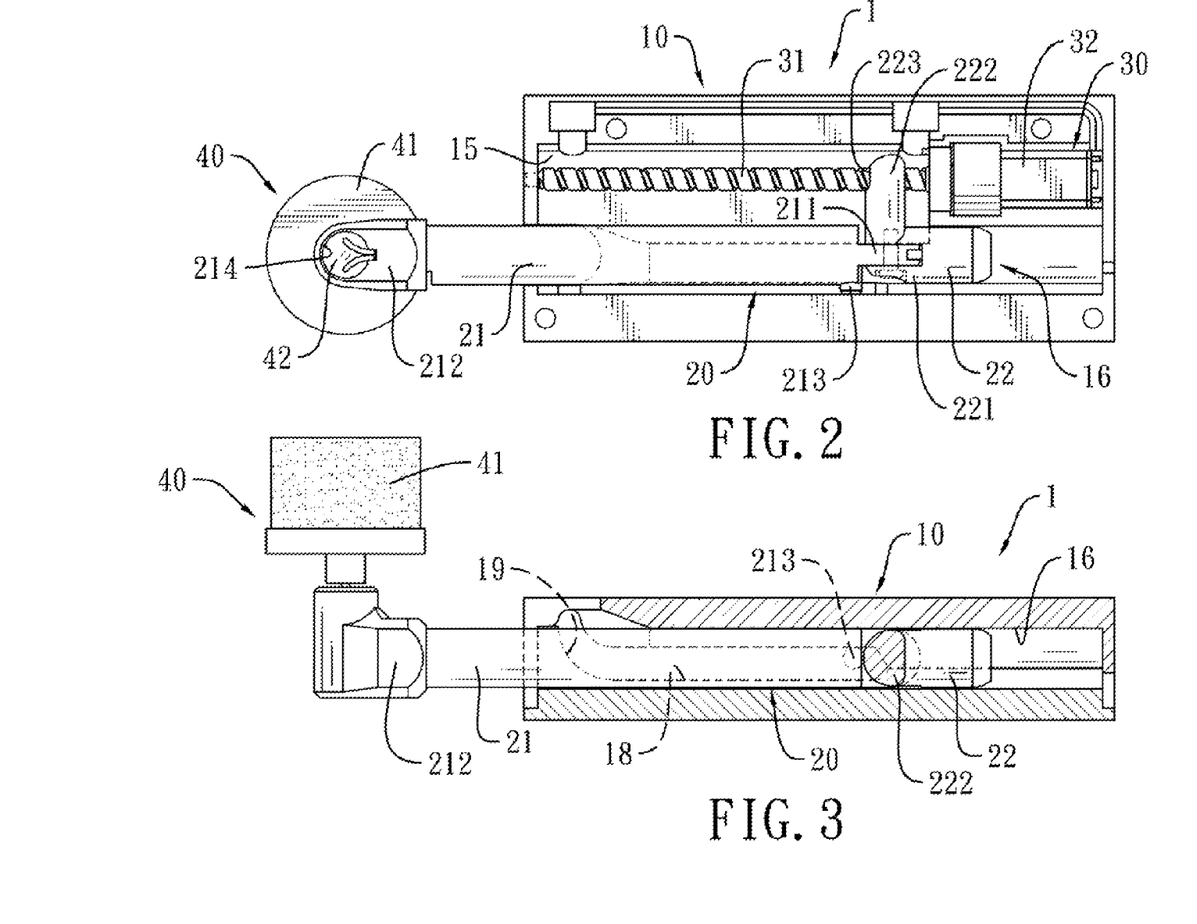
FIG. 2 is a front view of the automatic cleaner in FIG. 1, showing a cover being omitted.
FIG. 3 is a top view in partial section of the automatic cleaner in FIG. 1.

With further reference to FIGS. 2 and 3, the housing 10 has a front end surface 13, a rear surface 14, a mounting chamber 15, a moving channel 16, an inner surface, a turning opening 17, a guiding groove 18 and a guiding portion 19. The mounting chamber 15 is formed in the housing 10. The moving channel 16 is formed in the housing 10 beside the mounting chamber 15. The inner surface of the housing 10 is defined around the moving channel 16. The turning opening 17 is formed through the front end surface 13 of the housing 10, extends through the rear surface 14 of the housing 10, and corresponds to and communicates with the moving channel 16. The guiding groove 18 is formed in the inner surface of the housing 10, extends parallel to the moving channel 16 and has a front end corresponding to the turning opening 17. The guiding portion 19 is formed on the inner surface of the housing 10, is disposed at the front end of the guiding groove 18 and is curved to the rear surface 14 of the housing 10.

Preferably, the housing 10 has a hollow main body 11 and a cover 12. The cover 12 is attached to the main body 11 via screws or other fastening means and has an inner surface corresponding to the main body 11. The turning opening 17 of the housing 10 is formed in the main body 11. The guiding portion 19 of the housing 10 is formed on the inner surface of the cover 12 and protrudes to the main body 11.

The operating assembly 20 has an operating rod 21 and a connector 22.

The operating rod 21 is mounted through the turning opening 17 and the moving channel 16 of the housing 10 and has a pivoting end 211, a mounting end 212, a guiding protrusion 213 and a mounting hole 214. The pivoting end 211 protrudes in the moving channel 16. The mounting end 212 is opposite to the pivoting end 211 and protrudes out of the housing 10. The guiding protrusion 213 is formed on an outer surface of the operating rod 21, is disposed adjacent to the pivoting end 211 and slidably protrudes into the guiding groove 18. The mounting hole 214 is formed through the mounting end 212.

The connector 22 is mounted in the housing 10, is pivotally connected to the pivoting end 211 of the operating rod 21 and has a pivoting portion 221, a connecting portion 222 and a threaded hole 223. The pivoting portion 221 is mounted in the moving channel 16 and is pivotally connected to the pivoting end 211 of the operating rod 21. The connecting portion 222 protrudes into the mounting chamber 15 of the housing 10. The threaded hole 223 is formed through the connecting portion 222.

The driving assembly 30 is mounted in the mounting chamber 15 of the housing 10, is connected to the connector 22, drives the operating assembly 20 to move linearly and the operating rod 21 to protrude out of the housing 10, turn and move back in the housing 10, and has a lead threaded rod 31 and a driving motor 32. The lead threaded rod 31 is pivotally mounted in the mounting chamber 15 of the housing 10, is parallel to the moving channel 16 and is mounted through and engages the threaded hole 223 of the connector 22 of the operating assembly 20. The driving motor 32 is mounted in the mounting chamber 15 of the housing 10, is connected to an end of the lead threaded rod 31 and drives the lead threaded rod to rotate.

The cleaning assembly 40 is mounted on the mounting end 212 of the operating rod 21 and outside the housing 10, and has a cleaning motor 42 and a cleaning head 41. The cleaning motor 42 is mounted on the mounting end 212 of the operating rod 21 and is mounted in the mounting hole 214 of the operating rod 21. The cleaning head 41 is made of soft materials, such as foam material or the like, and is connected to and driven by the cleaning motor 42. Preferably, the cleaning motor 42 generates high twisting force to rotate the cleaning head 41 to clean a lens effectively.

Figure 4:
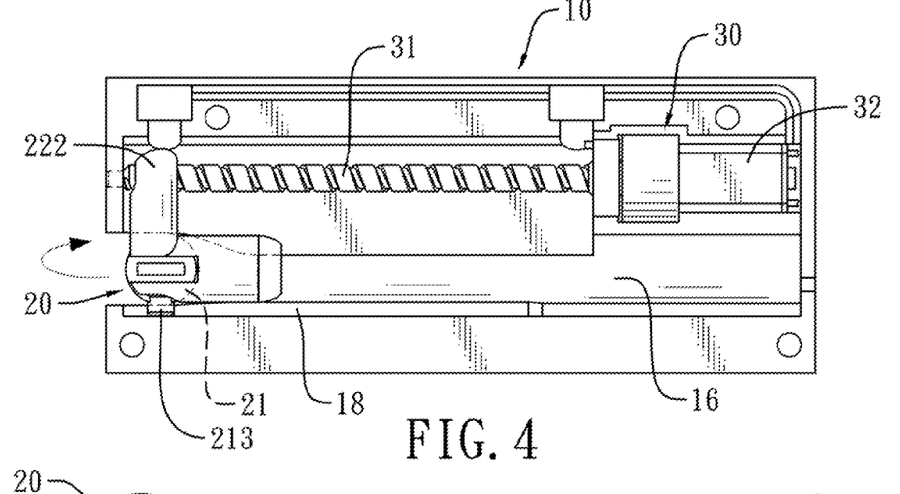
FIG. 4 is an operational front view of the automatic cleaner in FIG. 1, showing a cover being omitted.
Figure 5:
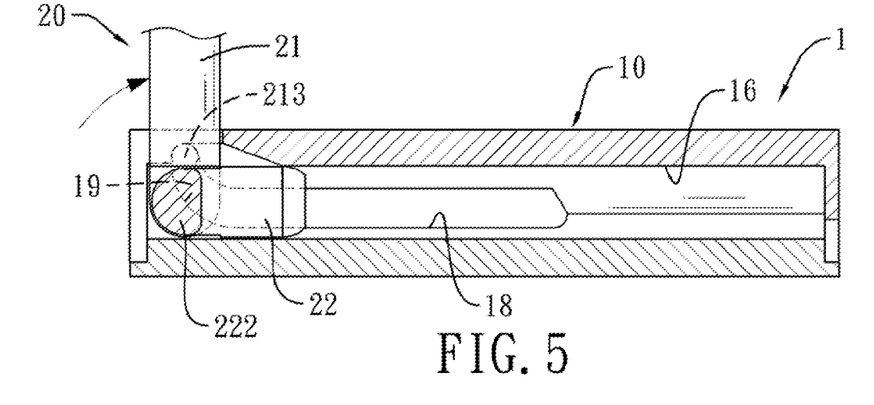
FIG. 5 is an operational top view in partial section of the automatic cleaner in FIG. 1.

With further reference to FIGS. 4 and 5, when the driving motor 32 of the driving assembly 30 rotates the lead threaded rod 31, the connector 22 of the operating assembly 20 moves axially along the lead threaded rod 31 and the operating rod 21 moves accordingly. Then, the guiding protrusion 213 of the operating rod 21 slides along the guiding groove 18 to the guiding portion 19 of the housing 10 so the operating rod 21 is turned from the front end surface 13 to the rear surface 14 of the housing 10.

Figure 8:
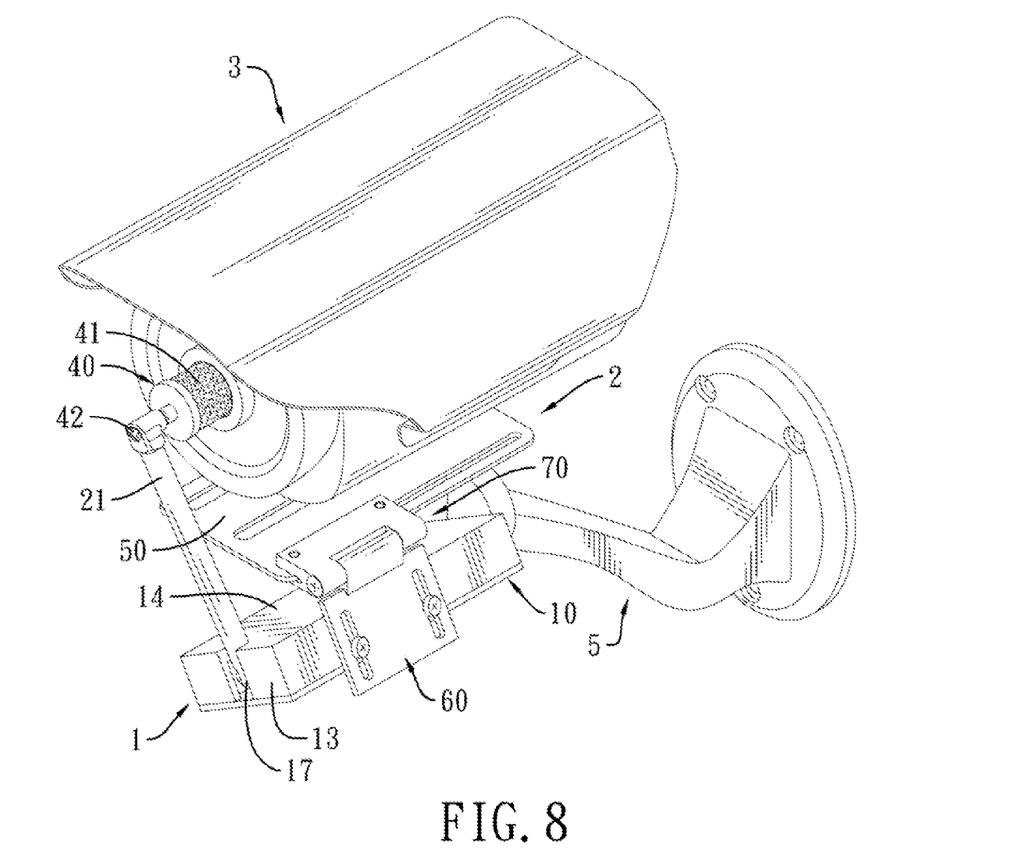
FIG. 8 is another operational perspective view of the automatic clean device in FIG. 6, showing the automatic clean device cleaning a lens of the surveillance camera.

With further reference to FIG. 8, consequently, the cleaning head 41 on mounting end 212 of the operating rod 21 abuts the lens 4 of the surveillance camera 3 and the cleaning motor 42 drives the cleaning head 41 to clean the lens 4.

After the lens 4 is cleaned, the cleaning motor 42 stops driving the cleaning head 41 and the driving motor 32 rotates the lead threaded rod 31 conversely. Thus, the connector 22 of the operating assembly 20 moves reversely and the operating rod 21 moves back into the housing 10.

Figure 6:
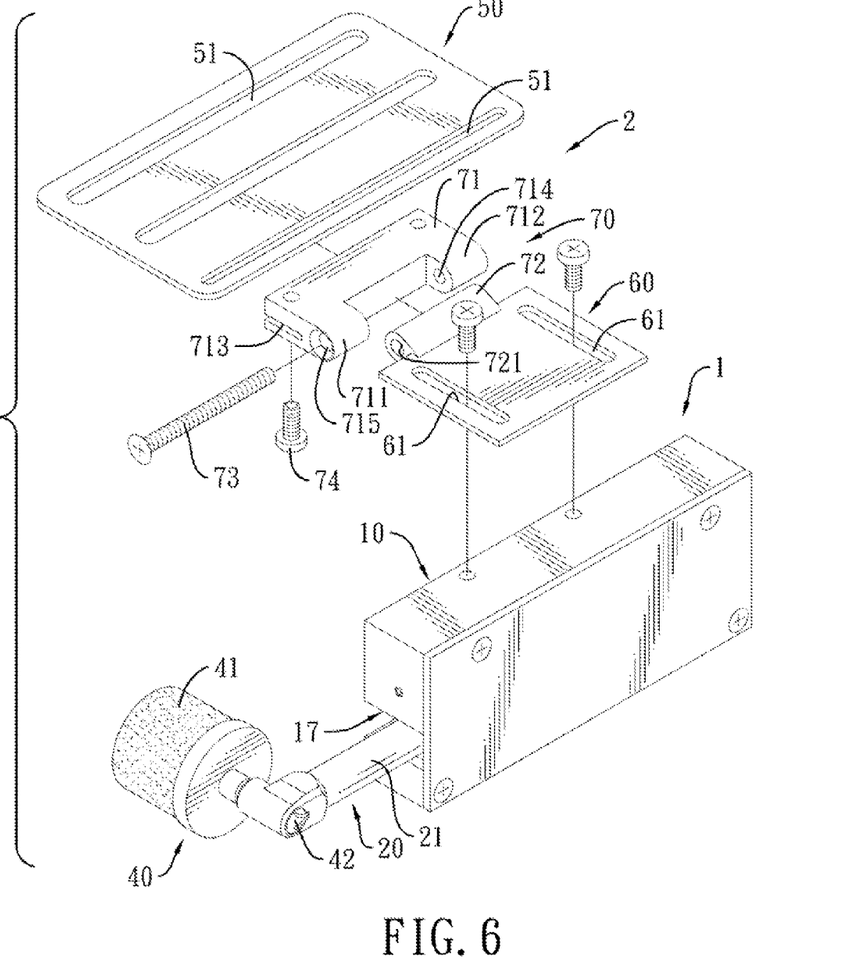
FIG. 6 is an exploded perspective view of the automatic clean device.

With reference to FIGS. 6 and 7, the positioning frame 2 connects the automatic cleaner 1 to the surveillance camera 3 to adjust relative positions of the automatic cleaner 1 and the surveillance camera 3, and has a first adjusting panel 50, a second adjusting panel 60 and an angle adjusting mechanism 70.

The first adjusting panel 50 has at least one first elongated hole 51 parallelly formed through the first adjusting panel 50. The first adjusting panel 50 is connected to the surveillance camera 3 via at least one fastener mounted through the at least one first elongated hole 51 and fastened to the surveillance camera 3, and is connected to a supporting bracket 5 that securely mounted on a wall. Thus, positions of the surveillance camera 3 on the first adjusting panel 50 are adjustable.

The second adjusting panel 60 is pivotally connected to the first adjusting panel 50, has at least one second elongated hole 61 parallelly formed through the second adjusting panel 60 and extending perpendicular to the at least one first elongated hole 51 of the first adjusting panel 50. The second adjusting panel 60 is connected to the housing 10 via at least one fastener mounted through the at least one second elongated hole 61 and fastened to the housing 10. Thus, positions of the automatic cleaner 1 on the second adjusting panel 60 are adjustable.

The angle adjusting mechanism 70 pivotally connects the first adjusting panel 50 to the second adjusting panel 60 and has a first connector 71, at least one first fastener 74, a second connector 72 and an adjusting fastener 73.

The first connector 71 is attached to the first adjusting panel 50, may be securely mounted on the first adjusting panel 50, may be formed on the first adjusting panel 50, and has a proximal edge, a distal edge, a receiving recess 713 and two ears 711, 712. The receiving recess 713 is formed in the proximal edge of the first connector 71 and receives the first adjusting panel 50. The ears 711, 712 separately protrude from the distal edge of the first connector 71. Each of the ears 711, 712 has a through hole 715, 714 axially formed through the ear 711, 712 and aligning with the through hole 715, 714 of the other ear 711, 712.

The at least one first fastener 74 is mounted through the first connector 71 and one of the at least one elongated hole 51 of the first adjusting panel 50 and is securely fastened to the first connector 71 to hold the first connector 71 and the first adjusting panel 50 together.

The second connector 72 is attached to the second adjusting panel 60, may be securely mounted on the second adjusting panel 60 via fasteners, such as screws or the like, may be formed on the second adjusting panel 60, is mounted between the ears 711, 712 of the first connector 71, is pivotally connected to the first connector 71 and has a through hole 721 axially formed through the second connector 72 and aligning with the through holes 715, 714 of the ears 711, 712.

The adjusting fastener 73 is securely mounted through the first and second connectors 71, 72, is mounted through the through holes 715, 714 of the ears 711, 712 and the through hole 721 of the second connector 72 and is selectively fastened to one of the ears 712. Thus, when the adjusting fastener 73 is loosened from the ear 712, the first and second connectors 71, 72 are able to rotate relatively so the second adjusting panel 60 is able to pivot relative to the first adjusting panel 50. When the adjusting fastener 73 is fastened to the ear 712, the first and second adjusting panels 50, 60 are held at specific angles.

Thus, adjusting angles between the first and second adjusting panels 50, 60 also adjusts relative positions of the automatic cleaner 1 and the surveillance camera 3.

The angle adjusting mechanism 70 allows the relative positions of the automatic cleaner 1 and the surveillance camera 3 to be adjusted in at least three degrees of freedom. Therefore, a position of the automatic cleaner 1 is able to be adjusted according to a size of the surveillance camera 3 to clean the lens 4 of the surveillance camera 3 thoroughly.

The automatic clean device as described has the following advantages. The cleaning head 41 is not disposed in front of the lens 4 and is disposed away from the lens 4 when the operating rod 21 is stored in the housing 10. Thus, the cleaning head 41 does not obstruct the surveillance camera 3 so the surveillance camera 3 is able to film complete images. Moreover, as an inclination of the operating rod 21 changes, a contact area of the foam material cleaning head 41 and the lens 4 is also adjusted. Consequently, the cleaning head 41 is able to clean the lens 4 thoroughly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic clean device for a surveillance camera comprising an automatic cleaner having
   a housing having
      a mounting chamber formed in the housing;
      a moving channel formed in the housing beside the mounting chamber;
      an inner surface defined around the moving channel;
      a turning opening formed through the housing and corresponding to and communicating with the moving channel;
      a guiding groove formed in the inner surface of the housing, extending parallel to the moving channel and having a front end corresponding to the turning opening; and
      a guiding portion formed on the inner surface of the housing and disposed at the front end of the guiding groove and being curved;
   an operating assembly having
      an operating rod mounted through the turning opening and the moving channel of the housing and having a pivoting end and a mounting end; and
      a connector mounted in the housing and pivotally connected to the operating rod;
   a driving assembly mounted in the mounting chamber of the housing, connected to the connector and driving the operating assembly to move linearly and the operating rod to protrude out of the housing, turn and move back in the housing; and
   a cleaning assembly having
      a cleaning motor mounted on the mounting end of the operating rod; and
      a cleaning head connected to the cleaning motor.

2. The automatic clean device as claimed in claim 1, wherein
   the housing has a front end surface and a rear surface;
   the turning opening of the housing is formed through the front end surface of the housing and extends through the rear surface of the housing; and
   the guiding portion of the housing is curved to the rear surface of the housing.

3. The automatic clean device as claimed in claim 2, wherein
   the pivoting end of the operating rod protrudes in the moving channel of the housing;
   the mounting end of the operating rod is opposite to the pivoting end and protrudes out of the housing;
   the operating rod further has a guiding protrusion formed on an outer surface of the operating rod, disposed adjacent to the pivoting end and slidably protruding into the guiding groove of the housing;
   the connector has
      a pivoting portion mounted in the moving channel and pivotally connected to the pivoting end of the operating rod;
      a connecting portion protruding into the mounting chamber of the housing; and
      a threaded hole formed through the connecting portion;
   the driving assembly has
      a lead threaded rod pivotally mounted in the mounting chamber of the housing, being parallel to the moving channel and mounted through and engaging the threaded hole of the connector of the operating assembly; and
      a driving motor mounted in the mounting chamber of the housing, connected to an end of the lead threaded rod and driving the lead threaded rod to rotate; and
   the clean head of the cleaning assembly is made of foam material.

4. The automatic clean device as claimed in claim 3, wherein
   the housing has a hollow main body and a cover attached to the main body via screws and having an inner surface corresponding to the main body;
   the turning opening of the housing is formed in the main body; and
   the guiding portion of the housing is formed on the inner surface of the cover and protrudes to the main body.

5. The automatic clean device as claimed in claim 1 further having a positioning frame connecting the automatic cleaner to the surveillance camera to adjust relative positions of the automatic cleaner and the surveillance camera.

6. The automatic clean device as claimed in claim 2 further having a positioning frame connecting the automatic cleaner to the surveillance camera to adjust relative positions of the automatic cleaner and the surveillance camera.

7. The automatic clean device as claimed in claim 3 further having a positioning frame connecting the automatic cleaner to the surveillance camera to adjust relative positions of the automatic cleaner and the surveillance camera.

8. The automatic clean device as claimed in claim 4 further having a positioning frame connecting the automatic cleaner to the surveillance camera to adjust relative positions of the automatic cleaner and the surveillance camera.

9. The automatic clean device as claimed in claim 5, wherein the positioning frame has
   a first adjusting panel having at least one first elongated hole parallelly formed through the first adjusting panel, and the first adjusting panel adjustably connected to the surveillance camera via at least one fastener mounted through the at least one first elongated hole and fastened to the surveillance camera;
   a second adjusting panel pivotally connected to the first adjusting panel, having at least one second elongated hole parallelly formed through the second adjusting panel and extending perpendicular to the at least one first elongated hole of the first adjusting panel, and the second adjusting panel adjustably connected to the housing via at least one fastener mounted through the at least one second elongated hole and fastened to the housing; and
   an angle adjusting mechanism pivotally connecting the first adjusting panel to the second adjusting panel.

10. The automatic clean device as claimed in claim 6, wherein the positioning frame has
   a first adjusting panel having at least one first elongated hole parallelly formed through the first adjusting panel, and the first adjusting panel adjustably connected to the surveillance camera via at least one fastener mounted through the at least one first elongated hole and fastened to the surveillance camera;
   a second adjusting panel pivotally connected to the first adjusting panel, having at least one second elongated hole parallelly formed through the second adjusting panel and extending perpendicular to the at least one first elongated hole of the first adjusting panel, and the second adjusting panel adjustably connected to the housing via at least one fastener mounted through the at least one second elongated hole and fastened to the housing; and
an angle adjusting mechanism pivotally connecting the first adjusting panel to the second adjusting panel.

11. The automatic clean device as claimed in claim 7, wherein the positioning frame has
a first adjusting panel having at least one first elongated hole parallelly formed through the first adjusting panel, and the first adjusting panel adjustably connected to the surveillance camera via at least one fastener mounted through the at least one first elongated hole and fastened to the surveillance camera;
a second adjusting panel pivotally connected to the first adjusting panel, having at least one second elongated hole parallelly formed through the second adjusting panel and extending perpendicular to the at least one first elongated hole of the first adjusting panel, and the second adjusting panel adjustably connected to the housing via at least one fastener mounted through the at least one second elongated hole and fastened to the housing; and
an angle adjusting mechanism pivotally connecting the first adjusting panel to the second adjusting panel.

12. The automatic clean device as claimed in claim 8, wherein the positioning frame has
a first adjusting panel having at least one first elongated hole parallelly formed through the first adjusting panel, and the first adjusting panel adjustably connected to the surveillance camera via at least one fastener mounted through the at least one first elongated hole and fastened to the surveillance camera;
a second adjusting panel pivotally connected to the first adjusting panel, having at least one second elongated hole parallelly formed through the second adjusting panel and extending perpendicular to the at least one first elongated hole of the first adjusting panel, and the second adjusting panel adjustably connected to the housing via at least one fastener mounted through the at least one second elongated hole and fastened to the housing; and
an angle adjusting mechanism pivotally connecting the first adjusting panel to the second adjusting panel.

13. The automatic clean device as claimed in claim 9, wherein the angle adjusting mechanism of the positioning frame has
a first connector attached to the first adjusting panel;
a second connector attached to the second adjusting panel; and
an adjusting fastener securely mounted through the first and second connectors.

14. The automatic clean device as claimed in claim 10, wherein the angle adjusting mechanism of the positioning frame has
a first connector attached to the first adjusting panel;
a second connector attached to the second adjusting panel; and
an adjusting fastener securely mounted through the first and second connectors.

15. The automatic clean device as claimed in claim 11, wherein the angle adjusting mechanism of the positioning frame has
a first connector attached to the first adjusting panel;
a second connector attached to the second adjusting panel; and
an adjusting fastener securely mounted through the first and second connectors.

16. The automatic clean device as claimed in claim 12, wherein the angle adjusting mechanism of the positioning frame has
a first connector attached to the first adjusting panel;
a second connector attached to the second adjusting panel; and
an adjusting fastener securely mounted through the first and second connectors.

17. The automatic clean device as claimed in claim 13, wherein
the first connector of the angle adjusting mechanism is securely mounted on the first adjusting panel and has
a proximal edge;
a distal edge;
a receiving recess formed in the proximal edge of the first connector and receiving the first adjusting panel; and
two ears separately protruding from the distal edge of the first connector, and each of the ears having a through hole axially formed through the ear and aligning with the through hole of the other ear;
the second connector of the angle adjusting mechanism is formed on the second adjusting panel, is mounted between the ears of the first connector and has a through hole axially formed through the second connector and aligning with the through holes of the ears;
the adjusting fastener of the angle adjusting mechanism is mounted through the through holes of the ears and the through hole of the second connector and is selectively fastened to one of the ears; and
the angle adjusting mechanism further has at least one first fastener mounted through the first connector and one of the at least one elongated hole of the first adjusting panel and securely fastened to the first connector.

18. The automatic clean device as claimed in claim 14, wherein
the first connector of the angle adjusting mechanism is securely mounted on the first adjusting panel and has
a proximal edge;
a distal edge;
a receiving recess formed in the proximal edge of the first connector and receiving the first adjusting panel; and
two ears separately protruding from the distal edge of the first connector, and each of the ears having a through hole axially formed through the ear and aligning with the through hole of the other ear;
the second connector of the angle adjusting mechanism is formed on the second adjusting panel, is mounted between the ears of the first connector and has a through hole axially formed through the second connector and aligning with the through holes of the ears;
the adjusting fastener of the angle adjusting mechanism is mounted through the through holes of the ears and the through hole of the second connector and is selectively fastened to one of the ears; and
the angle adjusting mechanism further has at least one first fastener mounted through the first connector and one of the at least one elongated hole of the first adjusting panel and securely fastened to the first connector.

19. The automatic clean device as claimed in claim 15, wherein
the first connector of the angle adjusting mechanism is securely mounted on the first adjusting panel and has
a proximal edge;
a distal edge;
a receiving recess formed in the proximal edge of the first connector and receiving the first adjusting panel; and two ears separately protruding from the distal edge of the first connector, and each of the ears having a through hole axially formed through the ear and aligning with the through hole of the other ear;

the second connector of the angle adjusting mechanism is formed on the second adjusting panel, is mounted between the ears of the first connector and has a through hole axially formed through the second connector and aligning with the through holes of the ears;

the adjusting fastener of the angle adjusting mechanism is mounted through the through holes of the ears and the through hole of the second connector and is selectively fastened to one of the ears; and the angle adjusting mechanism further has at least one first fastener mounted through the first connector and one of the at least one elongated hole of the first adjusting panel and securely fastened to the first connector.

20. The automatic clean device as claimed in claim 16, wherein the first connector of the angle adjusting mechanism is securely mounted on the first adjusting panel and has a proximal edge;

a distal edge;

a receiving recess formed in the proximal edge of the first connector and receiving the first adjusting panel; and two ears separately protruding from the distal edge of the first connector, and each of the ears having a through hole axially formed through the ear and aligning with the through hole of the other ear;

the second connector of the angle adjusting mechanism is formed on the second adjusting panel, is mounted between the ears of the first connector and has a through hole axially formed through the second connector and aligning with the through holes of the ears;

the adjusting fastener of the angle adjusting mechanism is mounted through the through holes of the ears and the through hole of the second connector and is selectively fastened to one of the ears; and the angle adjusting mechanism further has at least one first fastener mounted through the first connector and one of the at least one elongated hole of the first adjusting panel and securely fastened to the first connector.

* * * * *